Feb. 2, 1943.   H. W. KELSEY   2,309,906
LAWN TRIMMER
Filed Feb. 11, 1941   2 Sheets-Sheet 1
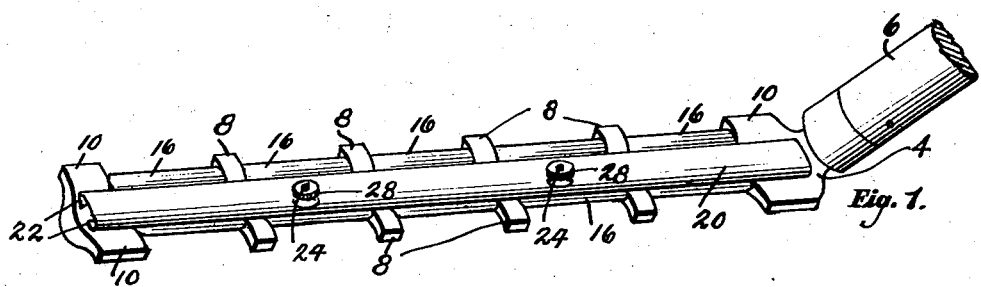
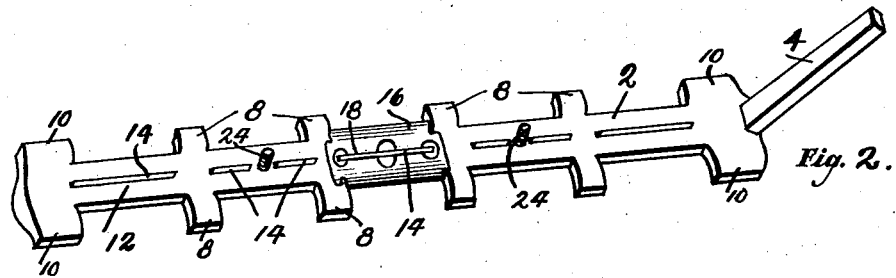
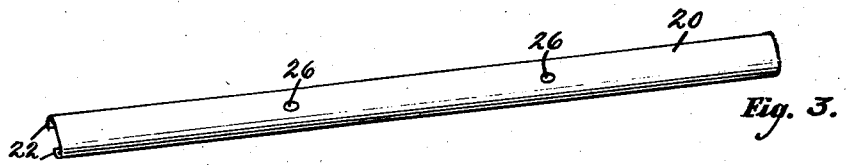
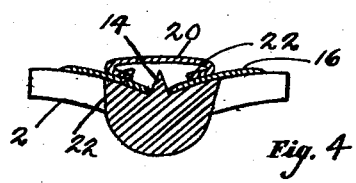

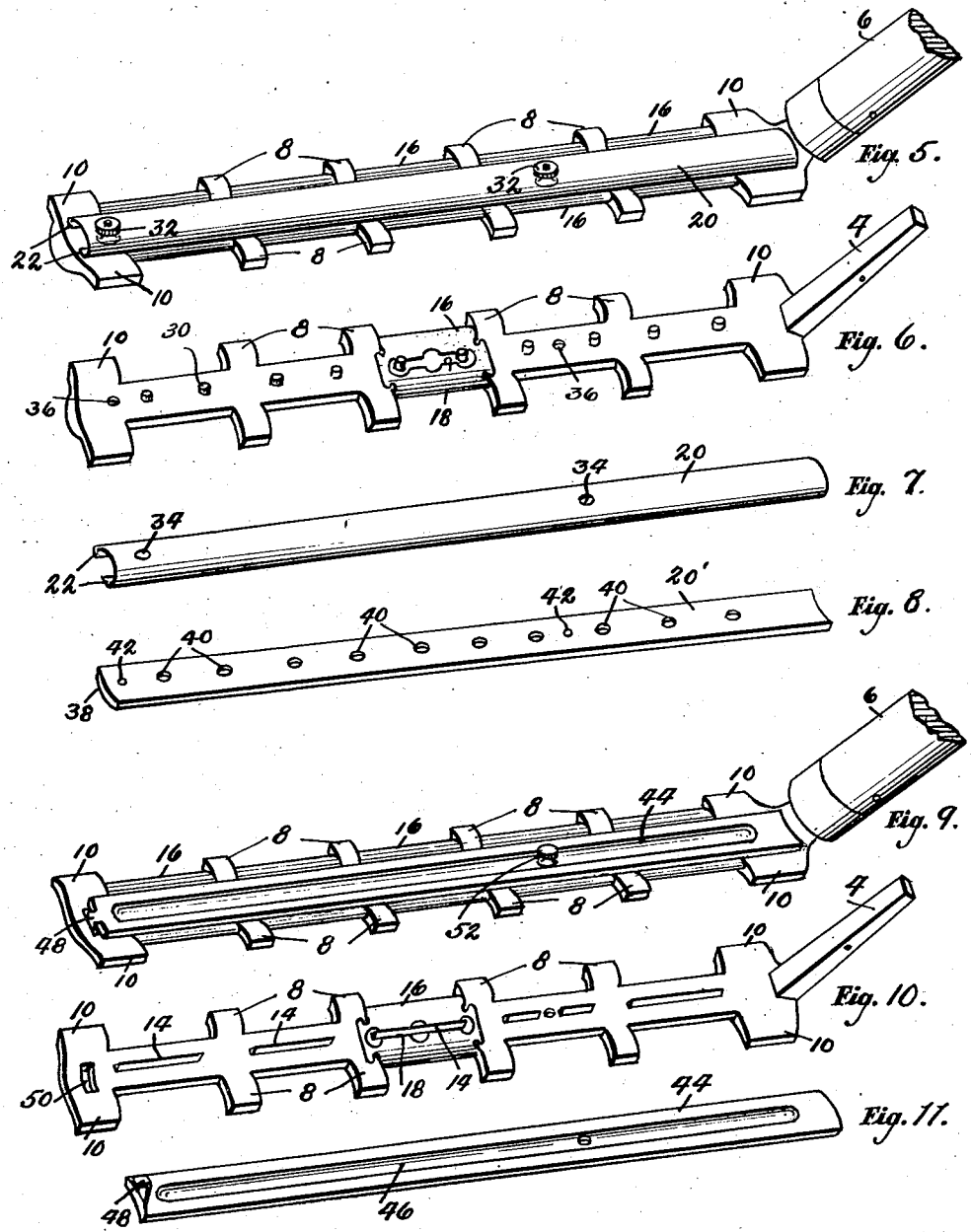

Patented Feb. 2, 1943

2,309,906

UNITED STATES PATENT OFFICE 2,309,906

LAWN TRIMMER

Howard W. Kelsey, Bayside, N. Y.

Application February 11, 1941, Serial No. 378,333

3 Claims. (Cl. 30—299)

My invention is directed to an improvement in lawn trimmers, and has for one of its objects the provision of a construction which is simple in construction, inexpensive to manufacture and can be used efficiently by the most inexperienced with excellent results in the trimming of grass about flower beds, lawn edges, along roads and walks, around trees and bushes.

A further object of my invention is the provision of a hand operated lawn trimmer having the above characteristics, which is double edged, so that it may be swung from right to left or vice versa when in use, this feature also adapting the tool to use in either hand with equal facility.

A still further object of my invention is the provision of a construction employing a plurality of separately removable blades, so that upon dulling or breaking of any blade the same easily may be replaced without the trouble and expense of removing or otherwise disturbing the others.

A still further object of the invention is the provision of a tool of the general character indicated comprising a double edged cutter which is bowed slightly in an upward direction with respect to the horizontal so as always to present a cutting edge at the most efficient angle to the blades of grass being trimmed when the tool is in use. In other words, the tool is swung in an arc with respect to the horizontal, with the top of the shaft of the tool as the pivot and by bowing the cutters on a curve the radius of which approximates that of the arc or swing of the tool the applied force is directly in line with the curve of the cutter, so that not only do we have the cutter striking the grass blades correctly and most efficiently but all tendency of the cutter itself to be deflected either upwardly or downwardly is eliminated with the net result that the grass will be cut and breakage of the cutter from deflection reduced to a minimum.

A still further object of the invention is the provision of a construction in which new or used double-edged safety razor blades may be employed as the cutting elements.

In the accompanying drawings:

Fig. 1 shows one embodiment of my invention;

Fig. 2 shows the tool of Fig. 1 with the hold-down or clamp plate removed;

Fig. 3 is a view of the hold-down or clamp plate of Fig. 1;

Fig. 4 is an enlarged cross section through the tool head;

Figs. 5, 6 and 7 are views similar to Figs. 1, 2 and 3 of another embodiment of the invention;

Fig. 8 shows a modified form of clamp plate; and

Figs. 9, 10 and 11 are views similar to Figs. 1, 2 and 3 of another embodiment of the invention.

Referring to the drawings in detail, and first of all to the embodiment of the invention as illustrated in Figs. 1, 2 and 3;

2 designates the tool head which comprises a body portion provided at its rear end with a shank 4. This shank is inserted into the shaft 6 of the tool. The shank extends at such an angle to the body portion of the tool head that with the shaft 6 held in the hands of an operator standing erect the tool head will lie approximately parallel to the ground.

The tool head is of metal, such as aluminum or an alloy thereof, brass, steel, etc., or it may be made of a suitable plastic, and is provided along each side with spaced transversely extending guards 8. The forward and rear ends of the body portion of the head is also shaped to provide end guards 10 extending transversely of the body.

As illustrated in Figs. 1 and 2 the upper face 12 of the body portion of the tool head is slightly concaved, and at intervals this concaved part of the tool head is provided with longitudinally extending ribs 14. These ribs are provided for preventing twisting and shifting of the blades of the trimmer, as will be brought out presently.

16 designates the cutters of my improved tool. These cutters are double edged and, as above pointed out, for economical reasons may be composed of double-edged safety razor blades.

Each of the cutters 16 is provided with a longitudinally extending slot 18 which receives the ribs 14. The latter are so spaced that there is at least one rib to each cutter 16 so that pivoting and lateral shifting of the cutters is prevented. These ribs not only prevent pivoting of the cutters or lateral displacement of the cutters but they also afford a certain amount of backing the length of the cutters and reduce splitting of the cutters when the tool is in use. The ribs are located along the center line of the tool head so as properly to center the cutters with respect to the sides of the head, and the head is of such a width that the cutters will extend a short distance beyond each side of the head. The guards 8, above referred to, extend beyond the edges of the cutters, as seen from the drawings, and are provided to protect the operator of the tool against injury as well as to protect injury to the cutters themselves.

To hold the cutters to the tool head I provide a clamp plate 20. In the embodiment of the invention illustrated in Figs. 1 to 3, this plate is of sheet metal with its edges turned under as illustrated at 22. The clamp plate is narrower than the cutters 16 so as to leave the edges of the cutters exposed and is held in place by integral threaded studs 24. These studs are received by holes 26 in the plate 20 when the plate is in position, and the plate is held down by knurled nuts 28 which are screwed upon the studs 24. The clamp plate is superimposed on the cutters and its turned-down edges 22 forced into firm engagement with the cutters so as to bow the cutters into the curve or concavity of the face of the tool head. It is to be noted that the curve of the turned-under edges 22 matches the concavity in the face of the cutter head, and that these edges have a fairly long bearing on the face of the cutters. This not only promotes proper arcing or bowing of the cutters but provides an extended bearing surface resisting upward movement of the cutters. It is to be noted also that the line of contact of the edges of the hold-down plate with the cutters is at the edges of or slightly beyond the head so as to reduce to a minimum the length of the lever arm between the contact of the plate with the cutters and the edges of the cutters, and to the same degree reducing breaking of the cutters due to deflection when the tool is in use.

It is to be noted also that the radius of the bow or arc of the cutters 16 approximates that of the arc in which the head is swung when the tool is used. As a consequence the force applied to the cutters is directly in line with the cutters and the cutters are presented to the grass blades most efficiently, and deflection of the cutters, either upwardly or downwardly, is reduced to a minimum.

Referring again to the ribs 14, it is to be noted from Fig. 4 that these ribs are triangular in cross section. This makes for easy application of the cutters in assembling the tool but the tapered feature has another important function. As will be seen from Fig. 4, when the tool is assembled with the cutters bowed, as above described, the metal of the cutters to the full depth of the cutters has a bearing against the ribs. I have found that this reduces splitting of the blades to the minimum. In other words, by bowing the cutters as above explained and employing the tapered ribs 14, not only is the force applied to the cutters as the tool is swung, directly in line with the cutters, but the impact of the cutters striking the blades of grass is taken up throughout the entire thickness of the cutters, due to the fact above pointed out that the cutters bear against the sides of the tapered ribs 14 throughout the thickness of the cutters, as distinguished from a mere line contact which would be the case were the ribs 14 straight sided.

The tool is light in weight and can be operated with one hand. I have found that it is very effective for trimming around flower beds, lawn edges and the like, along walks, roads, etc. and because of its light weight and the keenness of the cutters the tool may readily be used under overhanging growths from an erect position, with a shaving or drawing motion. It is to be appreciated that the tool is not for mowing lawns, stubble and coarse growths. I have found that cutters such as safety razor blades, new or used, are very effective and by reason of the simplicity of my construction it is a very simple matter to renew them when they become dulled or broken.

Referring now to Figs. 5, 6 and 7:

In this embodiment of my invention the body 2 of the tool head is provided with upstanding studs 30 which are received by the slots 18 in the cutters 16. The hold-down or clamp plate 20 is similar to that employed in Fig. 1, but in this instance is held in place by two screws 32 which pass through the plate at 34. These screws are received by the holes 36 provided for that purpose in the tool head.

With reference to Fig. 8: This figure merely illustrates a clamp plate 20' which may be substituted for the plate 20 of Fig. 5, for instance. This plate 20' may be a stamping or casting, for instance, its underside being convex, as shown at 38, to conform to the concavity 12 of the cutter head. Inasmuch as this plate sits directly upon the cutters throughout its length, it is provided with perforations 40 for receiving the studs 30 of the head. In addition the plate is provided with holes 42 for receiving the holding screws 32.

With reference to the embodiment of my invention illustrated in Figs. 9, 10 and 11:

In this embodiment of my invention the body portion of the tool head is similar to that of Fig. 1, in that it is provided with guards 8 and its upper cutter-supporting face is concaved. However, instead of employing the studs 30 shown in Fig. 6 I provide the head of this embodiment of my invention with longitudinally extending integral ribs 14 which are received by the slots 18 of the cutters, similar to the embodiment of my invention illustrated in Figs. 1, 2 and 3.

The clamp plate 44 of this embodiment of my invention is a solid piece of metal with a groove 46 in its underside extending longitudinally of the plate. This groove receives the ribs 14 on the body of the cutter head. The outer end of the plate 44 is provided with an integral hook 48 which engages a slot 50 in the tool head when the plate is in place. It is merely necessary in assembling this tool, after the cutters 16 have been placed in position, to insert the hook 48 in the slot 50 with the rear end of the plate raised, and then to drop the plate down in place upon the cutters, the slot or groove 46 receiving the ribs 14. The plate is held down by a screw 52. It will be understood, of course, that when the plate is fastened down the cutters will be bowed, as explained in connection with Fig. 1.

It will be seen from all of the foregoing that I have provided a very simple, inexpensive garden tool which can readily be operated by anyone and which will be extremely efficient. By reason of the fact that the cutters may be discarded safety razor blades and are independently removable it will be appreciated that there is never any necessity for sharpening the tool, inasmuch as should any of the cutters become dulled or broken it is but the work of a moment to replace it.

I wish it to be understood that changes may be made in the details of construction and arrangement of parts within the purview of my invention.

What I claim is:

1. A lawn trimmer comprising in combination an elongated head, spaced guards integral with the head along the side of the head and projecting outwardly from the side of the head, cutters disposed along one face of the head, said cutters projecting beyond the side of the head with their cutting edges lying in the space between adjacent guards, and a clamping plate for clamping the cutters to the head.

2. A lawn trimmer comprising in combination an elongated head having a concaved face, integral guards projecting outwardly from the opposed sides of the head, the guards at one side of the head lying abreast of those at the opposite side of the head, cutters alined along the concave face of the head, said cutters being rectangular in plan and cut back at their corners so that with the main part of each cutter lying upon the head, the cutting edges will project beyond the sides of the head between adjacent guards, whereby lengthwise movement of the cutters is prevented by the guards, and a clamp plate superimposed upon the cutters for bowing the cutters to the concaved face of the head and for clamping the cutters to the head.

3. A lawn trimmer comprising in combination an elongated head having a concaved face, integral guards projecting outwardly from the opposed sides of the head, the guards along one side of the head lying abreast of those at the opposite side of the head, spaced ribs extending lengthwise of the said concaved face of the head, double edged cutters disposed along said concaved face of the head, said cutters being of a greater width than the head and each cutter being provided with a longitudinally extending slot for receiving certain of said ribs, said ribs being so positioned that with the cutters in place their cutting edges will extend into the space between adjacent guards, and a clamping plate superimposed upon the cutters for clamping the cutters to the head and for bowing the cutters to the concaved face of the head.

HOWARD W. KELSEY